M. B. GRAY.
APPARATUS FOR TESTING THE QUALITY OF GERMINATION IN SEEDS.
APPLICATION FILED AUG. 14, 1915.

1,172,787.

Patented Feb. 22, 1916.

WITNESSES

INVENTOR
MACOMB B. GRAY
BY
ATTORNEYS

UNITED STATES PATENT OFFICE.

MACOMB B. GRAY, OF BILLINGS, MONTANA.

APPARATUS FOR TESTING THE QUALITY OF GERMINATION IN SEEDS.

1,172,787.

Specification of Letters Patent.

Patented Feb. 22, 1916.

Application filed August 14, 1915. Serial No. 45,586.

*To all whom it may concern:*

Be it known that I, MACOMB B. GRAY, citizen of the United States, resident of Billings, county of Yellowstone, State of Montana, have invented certain new and useful Improvements in Apparatus for Testing the Quality of Germination in Seeds, of which the following is a specification.

My invention relates to an apparatus for testing the quality of germination in seeds, and the object of my invention is to provide a means of testing seeds by the use of water, cloth or other water-absorbing material, and a receptacle of metal, stone or other water-tight substance.

A further object is to make use of water by the capillary attraction of a wick, so that the seeds being tested may be easily and uniformly moistened, while avoiding an excessive amount of moisture.

A further object is to provide a means whereby the seeds being tested may be examined at will and without injury.

A further object is to provide a seed tester of compact form and one that will allow different kinds and quantities of seeds to be tested at the same time and in one operation, without the danger of such seeds becoming mixed together.

Other objects of the invention will appear from the following detailed description.

The invention consists generally in various constructions and combinations, all as hereinafter described and particularly pointed out in the claims.

Figure 1:
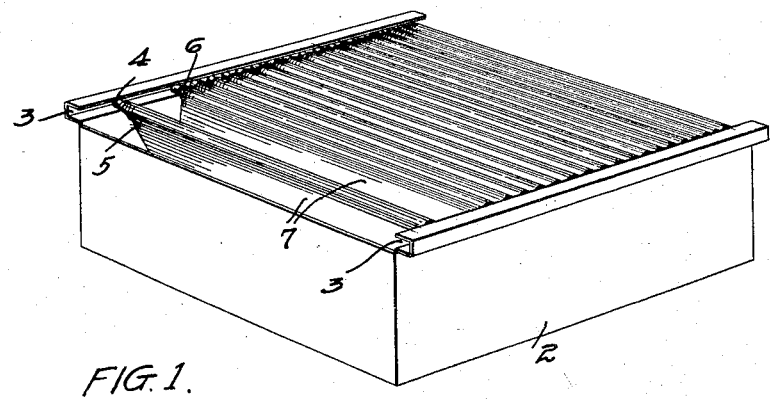
Figure 2:
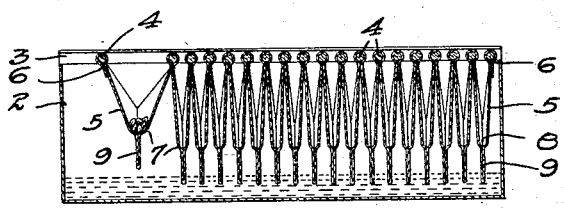
Figure 3:
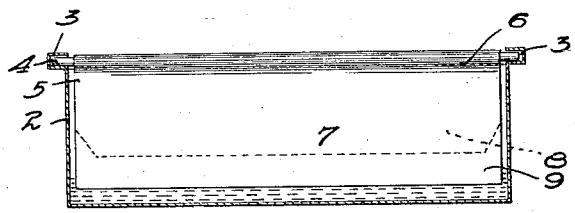

In the accompanying drawings forming part of this specification, Figure 1 is a perspective view of the device embodying my invention, Fig. 2 is a longitudinal cross section of the device, showing the arrangement of the absorbent material and the seed pockets, Fig. 3 is a cross sectional view, the dotted lines representing the seams or stitches in the absorbent material.

In the drawing, 2 represents a receptacle, of suitable size, made of metal or other suitable material and adapted to contain a supply of water and having preferably an open top. At the top of the side walls I provide opposing longitudinal grooves 3 supporting a series of rods 4 which are adapted to slide back and forth in said grooves.

5 represents a sheet of cloth, or other suitable water-absorbing material, having loops 6 formed transversely therein at suitable intervals to receive said rods, the ends of the rods extending beyond the loops on each side to enter the supporting grooves. The folds 7 of the sheet between the rods depend within the receptacle to a suitable distance above the bottom thereof, and are stitched parallel with the rods to form pockets 8 into which the seeds are placed. The stitches are turned upwardly at the ends of the row as indicated in Fig. 3 to prevent the formation of corners or angles in the pockets in which the seeds might collect and lodge. The part of the fold below each pocket forms a flap or wick portion 9 which extends into the water in the receptacle and the water flows up through these wicks by capillary attraction and moistens the seeds in the pockets. When the pockets have been folded, the rods may be pushed together in the grooves until the pockets are in close contact with one another and thereby a large number of pockets and a considerable quantity of seed can be placed in a comparatively small receptacle. To obtain access to the box, it is only necessary to separate the rods, when the seeds will be exposed and be readily accessible. Obviously a device of this kind will be very inexpensive to manufacture and the fabric sheet, when worn, can be easily renewed.

The device may be made in various sizes, according to the capacity desired, and in various ways the details of construction may be modified and still be within the scope of my invention.

I claim as my invention:

1. A seed testing apparatus comprising a water-tight receptacle having opposed longitudinal grooves in its side walls, a series of rods mounted to slide in said grooves, a sheet of water-absorbing material stitched transversely to form loops through which said rods are inserted, the downwardly projecting folds between said loops being stitched transversely to form seed pockets, and having depending parts forming wicks, whereby water is drawn up to moisten seeds placed in said pockets.

2. A seed testing apparatus comprising a water-tight receptacle having opposed longitudinal grooves in its side walls, a series of rods mounted to slide in said grooves, a sheet of water absorbing material mounted on said rods and having pockets formed therein to receive the seed to be tested, said sheet having parts depending below said pockets into the water in said receptacle.

3. A seed testing apparatus comprising a water-tight receptacle, a series of rods mounted to slide in said receptacle, a sheet of water-absorbing material having loops formed therein to receive said rods and folds depending between said rods and stitched to form seed supporting pockets, said folds having portions depending into the water in said receptacle, forming wicks for said pockets.

4. A seed testing apparatus comprising a receptacle adapted to contain a supply of water, a sheet of water-absorbing material folded and stitched to form a series of seed-supporting pockets, said sheet being supported on the walls of said receptacle for opening and closing said pockets, the bottom of said pockets being normally above the water line in said receptacle and provided with a depending wick portion extending below the water line, for the purpose specified.

MACOMB B. GRAY.

Witnesses:
FRANCES MILLEN GRAY,
THAD. S. SMITH.

Copies of this patent may be obtained for five cents each, by addressing the "Commissioner of Patents, Washington, D. C."